United States Patent
Culpepper

(10) Patent No.: US 7,093,827 B2
(45) Date of Patent: Aug. 22, 2006

(54) MULTIPLE DEGREE OF FREEDOM COMPLIANT MECHANISM

(75) Inventor: Martin L. Culpepper, Marblehead, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/175,415

(22) Filed: Jun. 19, 2002

(65) Prior Publication Data

US 2003/0086751 A1 May 8, 2003

Related U.S. Application Data

(60) Provisional application No. 60/336,995, filed on Nov. 8, 2001.

(51) Int. Cl.
  F16F 1/18 (2006.01)
  G02B 21/26 (2006.01)
  H02N 1/00 (2006.01)
  F16D 1/00 (2006.01)

(52) U.S. Cl. ............... 267/160; 267/181; 359/391; 310/309; 403/329

(58) Field of Classification Search ........... 403/119, 403/120, 291, 329, 52, 53; 267/158, 159, 267/160 X, 161–165, 181; 359/391 X, 392–395; 269/58; 310/309 X, 40 MM
See application file for complete search history.

(56) References Cited

U.S. PATENT DOCUMENTS

| 2,923,555 A | | 2/1960 | Kost et al. |
| 3,648,999 A | * | 3/1972 | Bauer .................. 267/160 |
| 3,748,912 A | * | 7/1973 | Hildebrand |
| 3,752,261 A | * | 8/1973 | Bushnell, Jr. |
| 4,225,264 A | | 9/1980 | Coone |
| 4,559,717 A | * | 12/1985 | Scire et al. |
| 4,615,591 A | * | 10/1986 | Smith et al. ........... 359/391 |
| 4,691,586 A | * | 9/1987 | van Leijenhorst et al. .... 269/58 |
| 4,700,932 A | | 10/1987 | Katsuno |
| 4,860,864 A | | 8/1989 | Cwycyshyn et al. |
| 5,083,757 A | | 1/1992 | Barsky |
| 5,086,901 A | | 2/1992 | Petronis et al. |
| 5,384,662 A | * | 1/1995 | Andresen et al. |
| 5,678,944 A | | 10/1997 | Slocum et al. |
| 5,769,554 A | | 6/1998 | Slocum |
| 6,069,415 A | | 5/2000 | Little et al. |

(Continued)

OTHER PUBLICATIONS

Flexural-hinge guided motion nanopositioner stage for precision machining: finite element simulations: A.A. Elmustafa, Max G. Lagally; Precision Engineering; Journal of the International Societies for Precision Engineering and Nanotechnology 25 (2002) 77-81.

(Continued)

Primary Examiner—Daniel P. Stodola
Assistant Examiner—Victor MacArthur
(74) Attorney, Agent, or Firm—Samson & Associates P.C.

(57) ABSTRACT

A compliant mechanism is provided for accurate and precision alignment of mechanical component parts, surfaces or assemblies and the like, where low-cost, accurate, and repeatable alignment are desired. The compliant mechanism may be used in applications that require high precision alignment and where the relative location of coupled components must be variable or adjustable. The compliant mechanism includes a stage coupled to a plurality of hinges, at least one tab coupled to one of the hinges, and a support coupled to the tab. The relative position of the stage and the support may be adjusted by actuating (i.e., displacing) the tab(s) or other parts of the structure, to enable controlled movement in six degrees of freedom therebetween.

41 Claims, 7 Drawing Sheets

U.S. PATENT DOCUMENTS 6,193,430 B1    2/2001    Culpepper et al.
6,467,761 B1 *    10/2002    Amatucci et al. ............. 269/58

OTHER PUBLICATIONS

Optimal design of a flexure hinge based XYO wafer stage; Jae W. Ryu, et al., Precision Engineering 21:18-28, 1997.

Planar And Spatial Three-Degree-of-Freedom Micro-Stages in Silicon Mems, Proceedings of the 16th Annual ASPE Conference, Crystal City, VA, Nov. 2001; Bernhard Jokiel, Jr., et al.

Kinematic Modeling and Analysis of a Planar Micro Positioner, Proceedings of the 16th Annual ASPE Conference, Crystal City, VA, Nov. 2001; Nicholar G. Dagalakis, et al.

Nanometer Cutting Machine Employing Parallel Mechanism, Proceedings of the 16th Annual ASPE Conference, Crystal City VA, Nov. 2001; Katsushi Furutani, et al.

F-206 Six Axis Parallel Kinematics Positioning System, MicroPositioning, NanoPositioning, NanoAutomation: Solutions for Cutting-Edge Technologies, 2002 Product Catalogue, Physik Instrument, pp. 8-8-8-15.

M-850 HEXAPOD 6 Axis Parallel Kinematics Robot MicroPositioning, NanoPositioning, NanoAutomation: Solutions for Cutting-Edge Technologies, 2002 Product Catalogue, Physik Instrument, pp. 7-16-7-17.

Hale, "Principles and Techniques for Designing Precision Machines", Ph.D. Thesis, M.I.T., Cambridge, MA, 1999, p. 184.

* cited by examiner

MULTIPLE DEGREE OF FREEDOM COMPLIANT MECHANISM

This application claims the benefit of U.S. Provisional Application Ser. No. 60/336,995, entitled Six Degree of Freedom Flexure Stage, filed Nov. 8, 2001.

BACKGROUND OF THE INVENTION (1) Field of the Invention

The present invention relates generally to precision alignment machines and mechanisms. More particularly, this invention relates to a compliant mechanism enabling relative movement between a stage portion and a support structure to be controlled with a relatively high degree of accuracy and precision with up to six degrees of freedom.

(2) Background Information

There is a growing need for fine motion control and positioning at meso, micro, and nano scales. Examples include active alignment of components in fiber optics packages, x-y stages with nanometer level resolution, and machine elements for meso- and micro-scale machinery.

Culpepper, in U.S. patent application Ser. No. 10/005,562, filed Nov. 8, 2001, entitled "Apparatus and Method for Accurate, Precise, and Adjustable Kinematic Coupling", (the '562 patent') which is fully incorporated herein by reference, discloses an adjustable kinematic coupling in which one or more of the kinematic elements (e.g., balls and grooves) may be rotated about or translated along an axis thereby effecting a relative movement between two components. The coupling is well suited for applications where alignment with nanometer/microradian accuracy and precision (i.e., repeatability) and/or where controlled adjustment of the relative position of the coupled components is required.

An alternate approach to fabricating machines requiring fine motion control and positioning has employed the use of compliant mechanisms, and in particular monolithic compliant mechanisms. These compliant mechanisms, however, have typically been planar in nature, having the ability to control at most two translational degrees of freedom and one rotational degree of freedom (i.e., x, y, and $\theta_z$). Examples include a rotational flexure stage for positioning a wafer relative to a microlithography projector disclosed by Barsky in U.S. Pat. No. 5,083,757, entitled "Rotational Flexure Stage"; a precision in plane (i.e., x, y, and $\theta_z$) stage for optical components disclosed by Hale in "Principles and Techniques for Designing Precision Machines", Ph.D. Thesis, M. I. T., Cambridge, Mass., 1999, p. 184; and a flexure-hinge guided motion nano-positioner disclosed by Elmustafa, et al. in "Flexural-hinge Guided Motion Nano-positioner Stage for Precision Machining: Finite Element Simulations," Precision Engineering, 2001, vol. 25, pp. 77–81.

Next generation applications (e.g., fiber optic alignment) will likely require compliant mechanisms capable of providing high resolution (i.e., nanometer/microradian) position control with six degrees of freedom (i.e., x, y, z, $\theta_x$, $\theta_y$, and $\theta_z$). Therefore there exists a need for new and improved flexures and/or compliant mechanisms that may be suitable for next generation applications.

SUMMARY OF THE INVENTION

One aspect of the present invention includes a compliant mechanism. The compliant mechanism includes a stage and a support both coupled to a plurality of flexure hinges, and at least one tab coupled to at least one of the flexure hinges. The tab is sized and shaped so that displacement of the tab results in a displacement of the stage relative to the support in any one or more of six degrees of freedom.

In one variation of this aspect, the compliant mechanism is of monolithic construction and includes a stage coupled to three flexure hinges. Three tabs are each coupled to a mutually distinct one of the three flexure hinges. A plurality of support beams are coupled to the three tabs, and at least one support member is coupled to the support beams. The support member includes at least one mount for fastening the compliant mechanism to another structure. The three tabs form lever arms and are coupled to the support beams at three fulcrum points. Displacement of any one of the three tabs generates a displacement of the stage relative to the support member(s) and enables the relative position between the stage and the support member(s) to be adjusted in any one or more of six degrees of freedom.

In another aspect, this invention includes an apparatus of a substantially monolithic construction including first and second reference frames, and at least one flexure hinge coupled therebetween. An actuator is coupled to the flexure hinge(s). Movement of the actuator generates displacement of the first reference frame relative to the second reference frame in any one or more of six degrees of freedom.

In still another aspect, this invention includes a method of aligning a first component and a second component to one another. The method includes using a compliant mechanism including a stage coupled to a plurality of flexure hinges, at least one tab coupled to one of the flexure hinges, and at least one support coupled to the tab(s). The method further includes fastening the first component to the stage, fastening the second component to the support, and displacing the tab(s) to effect a change in position of the first component relative to the second component in any one or more of six degrees of freedom.

In a further aspect, this invention includes a method of fabricating a compliant mechanism. The method includes providing a substantially planar work piece, forming a stage in the work piece, the stage being coupled to a plurality of flexure hinges, and forming at least one tab in the work piece, the tab(s) being coupled to one of the flexure hinges. The method further includes forming at least one support in the work piece, the support being coupled to the tab(s). The tab is sized and shaped so that displacement of the tab(s) results in a displacement of the stage relative to the support member(s)in any one or more of six degrees of freedom.

DETAILED DESCRIPTION

Figure 1:
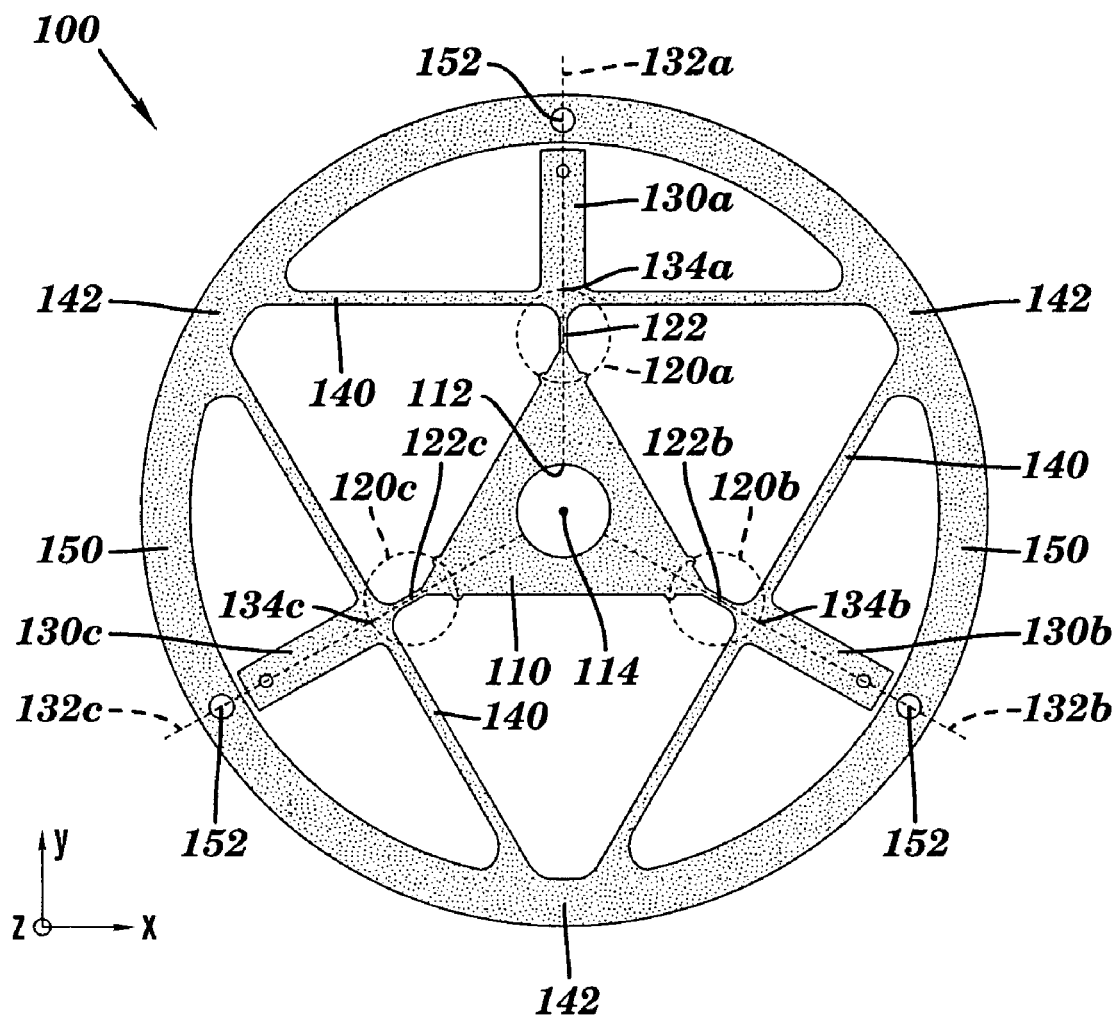
FIG. 1 is a plan view of one embodiment of a compliant mechanism fabricated in accordance with the present invention.

Referring to the accompanying figures, the present invention is directed to a flexure based mechanism, also referred to as a compliant mechanism or a planar compliant mechanism that may meet the stringent demands of next generation processes. The compliant mechanism is well suited for applications where alignment with nanometer, micron or millimeter scale accuracy and precision (i.e., repeatability) and/or where controlled adjustment of one component (e.g., an optical fiber) relative to another component (e.g., an optical lens) is required. Exemplary applications to which this invention may be well suited include, but are not limited to, precision automation, precision actuated motion stages, optical mounts, and assemblies such as precision fiber optic alignment machines, semiconductor and microelectromechanical mask alignment, structures with integrated precision actuation methods, micro testing and measurement devices, and other precision alignment devices.

In one embodiment, the present invention includes a planar compliant mechanism having an inner stage coupled to one or more relatively simple compliant elements, such as flexure hinges and tabs, that may utilize both elastic and plastic material deformation. Actuation of one or more of the tabs tends to result in relative movement between two reference frames, one fixed to the inner stage, the other fixed to a support member. In general, in plane actuation of the tabs tends to result in in plane motion while out of plane actuation tends to result in out of plane motion of the inner stage relative to the support member (in plane motion typically refers to motion in the x, y, and $\theta_z$, directions, while out of plane motion typically refers to motion in the $\theta_x$, $\theta_y$, and z directions). In a generally desirable embodiment, an inner stage is coupled to three flexure hinges, which are further coupled to three tabs. Although each flexure hinge is shown being axially aligned with corresponding tabs, the tabs may be offset or otherwise disposed off-axis relative to their corresponding flexure hinge, without departing from the spirit and scope of the present invention. Actuation of any one or more of the three tabs may provide for precision alignment in up to six degrees of freedom.

The present invention may be advantageous in that it provides for an improved compliant mechanism and method which enables accurate and repeatable location of two or more components, surfaces, assemblies, and the like, which overcomes at least one of the above-described limitations of prior alignment mechanisms. Another potential advantage of this invention is that it enables the relative position of the coupled components to be adjusted in any one or more of the six degrees of freedom by controlled actuation of one or more tabs. Yet another potential advantage of this invention is that the relative positions of the coupled components may be repeatedly adjusted. Still another potential advantage of this invention is that it may utilize both elastic and plastic deformation of the compliant mechanism's structure. A further advantage of this invention is that it may provide for an adjustable compliant mechanism with a sufficiently high displacement ratio (ratio of actuator input motion to output motion) to produce relatively small output movements (potentially sub-nanometer) with inputs that may be at least one order of magnitude larger.

This invention tends to be further advantageous in that it may be adapted for use with micro, meso, and macro scale applications. Furthermore, the tabs may be actuated using substantially any known, or yet to be developed, means. For example, comb drives may be utilized for MEMs applications, piezo electric actuators for meso scale machines, and conventional mechanical actuators for meso-macro scale applications.

Embodiments of this invention may be still further advantageous in that they are of a monolithic construction, which tends to reduce and/or eliminate friction induced hysteresis and wear that results from the repeated rubbing of components against one another, such as in a conventional contact based or segmented mechanism. These and other advantages of this invention will become evident in light of the following discussion of various embodiments thereof.

Referring now to FIG. 1, one embodiment of a planar compliant mechanism 100 of the present invention is illustrated. The compliant mechanism 100 is typically (although not necessarily) of monolithic construction (i.e., made from a single piece of material). The compliant mechanism 100 includes a stage 110, coupled to a plurality (e.g., three) of flexure hinges 120a, 120b, and 120c, which may be uniformly spaced thereabout (i.e., in the form of a substantially equilateral triangle). Inner stage 110 may optionally include a center aperture 112 through which a chuck or some other component may extend. Stage 110 may further optionally include other features, such as but not limited to, holes, slots, grooves, and the like for mounting one or more components thereto.

Flexure hinges 120a, 120b, and 120c are coupled to inner stage 110 at hinge points 122a, 122b, and 122c, respectively. At least one of the flexure hinges 120a, 120b, and 120c is further coupled to a tab (also referred to herein as a member) 130a, 130b, and 130c. In a desirable embodiment, each of three flexure hinges 120a, 120b, and 120c is coupled to a mutually distinct tab 130a, 130b, and 130c. Tabs 130a, 130b, and 130c typically extend radially outward along radial axes 132a, 132b, and 132c that typically pass through the center point 114 of the inner stage 110. Axes 132a, 132b, and 132c are fixed relative to support member(s) 150, with their position(s) being unchanged by actuation of the tabs 130a, 130b, and 130c. The tabs 130a, 130b, and 130c effectively function as lever arms and are coupled to at least one support beam 140 at at least one of fulcrum points 134a, 134b, and 134c about which they pivot. The term "fulcrum" is used herein in a manner consistent with the conventional dictionary definition, i.e., a pivot point about which a lever arm operates (Academic Press Dictionary of Science and Technology, 1992). Actuation of tabs 130a, 130b, and 130c is discussed in more detail hereinbelow.

The support beams 140 may be configured in substantially any manner. For example, in compliant mechanism 100 the support beams are configured in a substantially equilateral triangular pattern rotated about 180 degrees (i.e., half a turn) out of phase with the triangular inner stage 10. Support beams 140 may further be coupled to at least one support member 150, for example at the corners 142 of the triangular pattern of support beams 140. Support member(s) 150 are typically adapted to provide for mounting the compliant mechanism 100 to another structure. For example, compliant mechanism 100 includes a support member 150 in the form of an outer support ring (i.e., a circular portion that encloses and supports the other portions of the compliant mechanism) that includes a plurality of holes 152 configured for fastening (e.g., screwing) the compliant mechanism to another fixture. As described in more detail hereinbelow, actuation of tabs 130a, 130b, and 130c causes relative movement of the inner stage 110 with respect to support member(s) 150.

Figure 2:
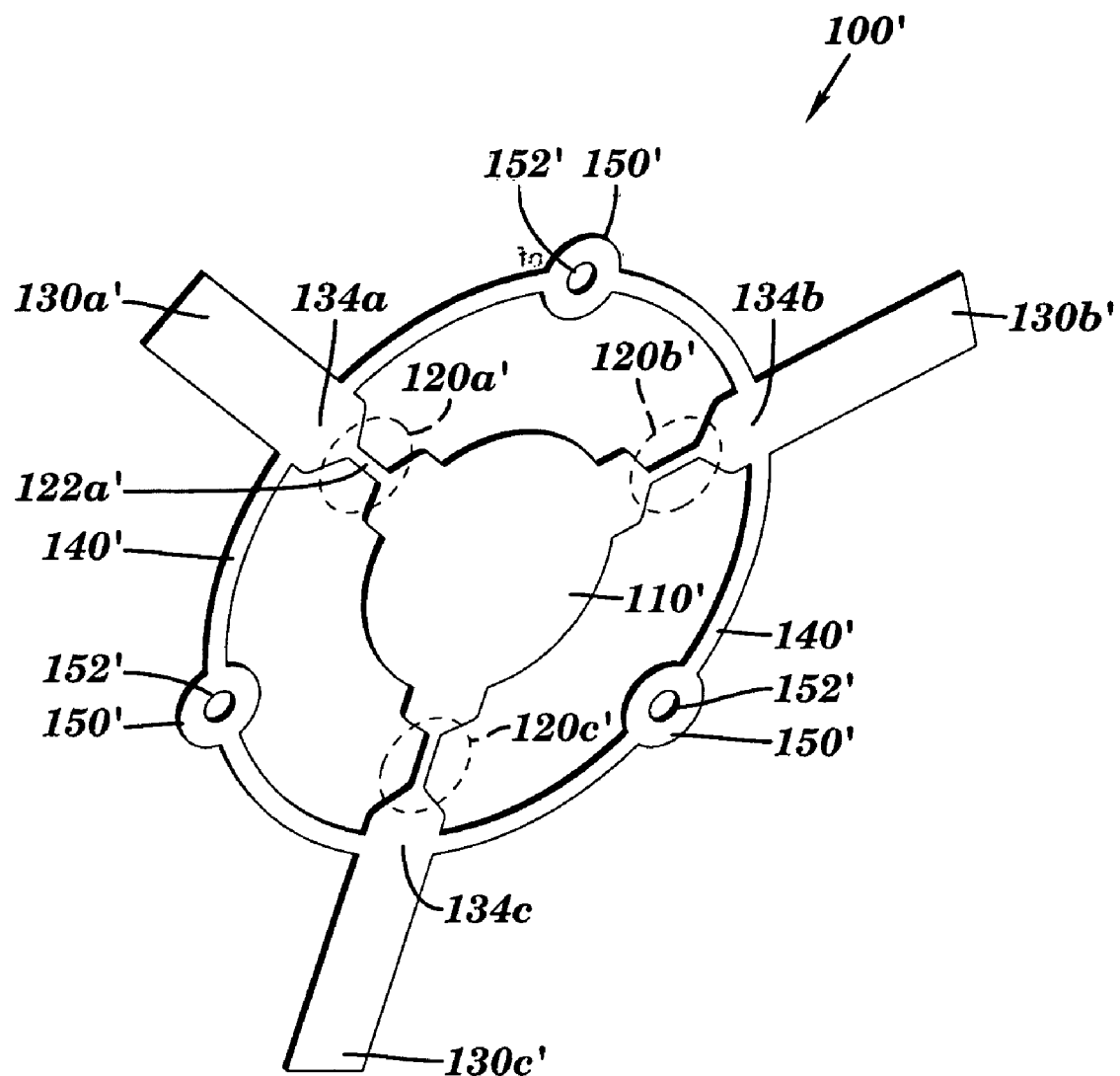
FIG. 2 is a plan view of another embodiment of a compliant mechanism fabricated in accordance with the present invention.
Figure 3:
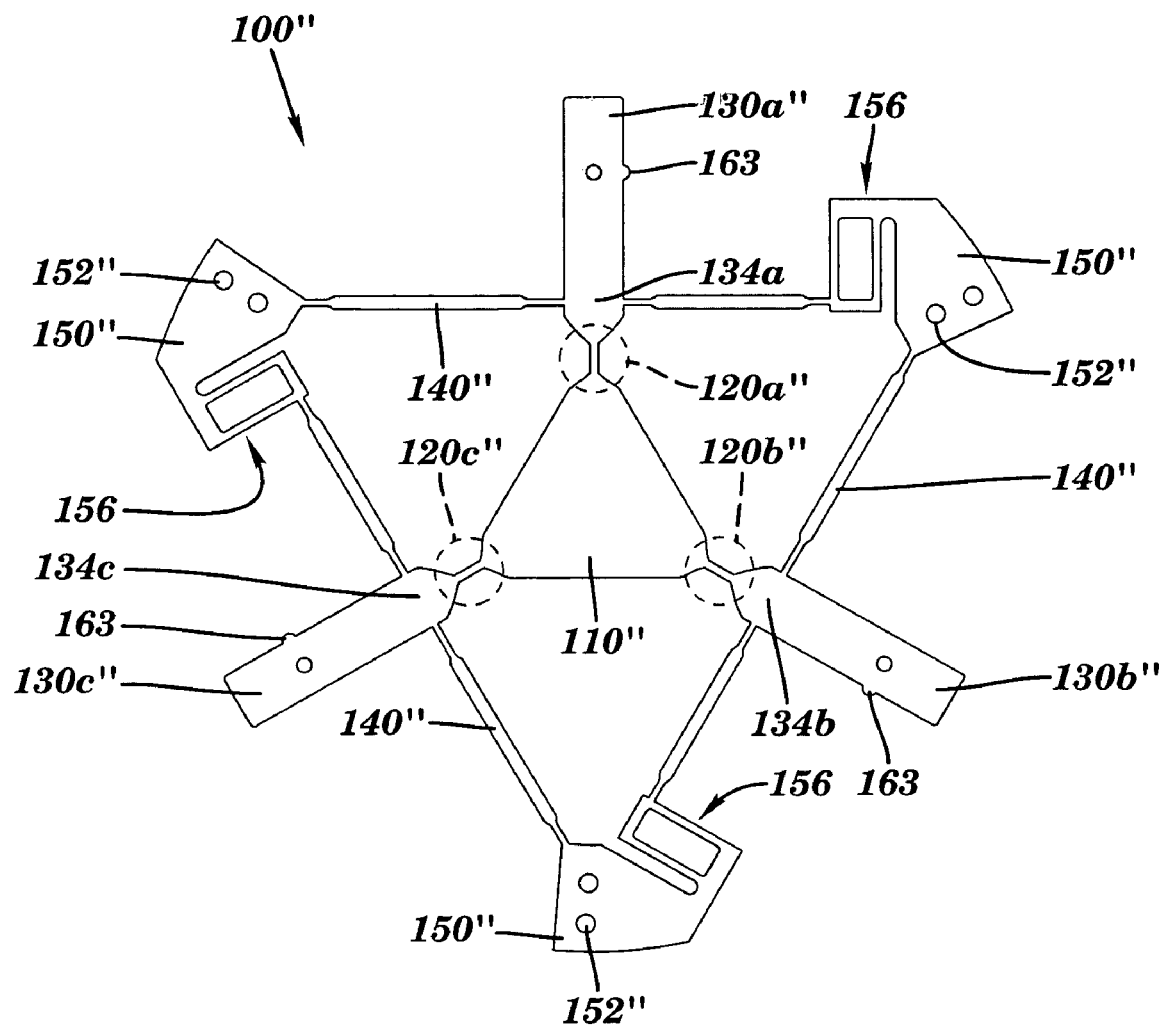
FIG. 3 is a plan view of still another embodiment of a compliant mechanism fabricated in accordance with the present invention.

Referring now to FIGS. 2 and 3 two alternate embodiments 100' and 100" of the compliant mechanism of this invention are illustrated. Compliant mechanisms 100' and 100" are similar to that of compliant mechanism 100 in that each includes an inner stage 110', 110" coupled to a plurality of flexure hinges 120a', 120b', 120c', and 120a", 120b", 120c", respectively, which are further coupled to one or more tabs 130a', 130b', 130c', and 130a", 130b", 130c", respectively, which are still further coupled to support beams 140', and 140", respectively, at fulcrum points 134a, 134b, and 134c.

Compliant mechanism 100' includes a substantially circular inner stage 110', as opposed to the substantially triangular inner stage 110 of compliant mechanism 100. Further, support beams 140' are configured in a substantially circular pattern about the circular inner stage 110'. Compliant mechanism 100' further differs from compliant mechanism 100 in that it includes a plurality (e.g., three) of support members 150' coupled to support beams 140'. Each of the support members 150' is typically in the form of a disk, having a central hole 152' for fastening the compliant mechanism 100' to another structure. Support members 150' are typically spaced to form a triangular (e.g., a substantially equilateral triangular) pattern in order to provide balanced support and stiffness.

Compliant mechanism 100" is further similar to that of compliant mechanism 100 in that it includes a substantially equilateral triangular inner stage 110 oriented about 180 degrees (i.e., half a turn) out of phase with a substantially triangular configuration of support beams 140". Support beams 140" are typically coupled to three support members 150" at the corners of the triangular configuration thereof. Support members 150" typically include a plurality of holes 152" for fastening the compliant mechanism 100" to another structure. Support members 150" further include constraining compliant mechanisms 156, which allow for a relatively high degree of relative movement between the inner stage 110" and support members 150" (as compared to compliant mechanisms 100 and 100') without requiring plastic deformation of the compliant mechanism's components. The thickness of support beams 140" may optionally be reduced proximate the tabs 130a", 130b", 130c" and support members 150", to reduce their stiffness and thus facilitate their plastic deformation.

Figure 4A:
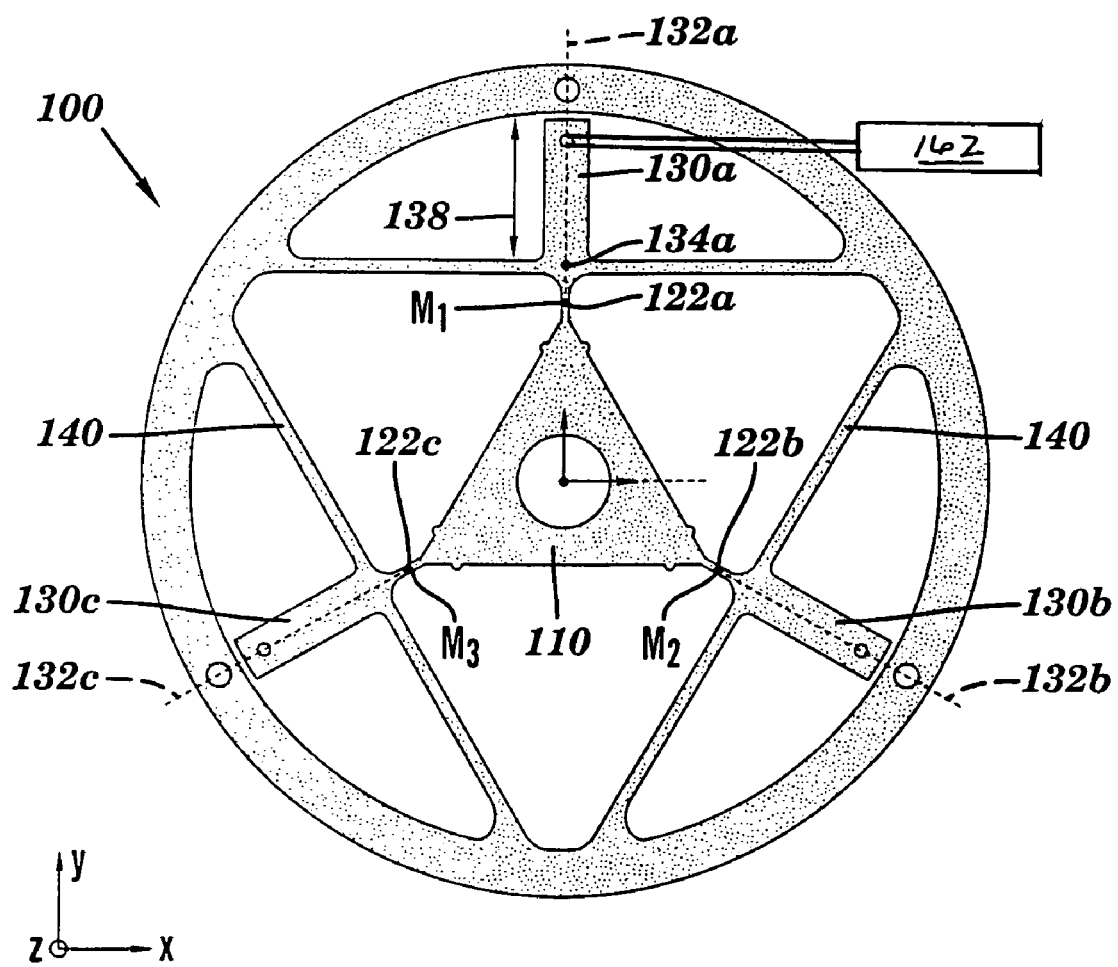
FIG. 4a is a plan view of the compliant mechanism of FIG. 1.

The tabs may further optionally include other features, such as but not limited to, holes, slots, grooves, protrusions, detents, and the like for interfacing with an actuator, such as actuator 162 of FIG. 4a. For example, the protrusions 163 in compliant mechanism 100" provide a feature against which an actuator may press. Rounded features may be used in some applications to ensure that the actuator engages the tab 130a", 130b", 130c" at a predetermined distance from the fulcrum point 134a, 134b, 134c, and is properly oriented to operate in a predetermined direction.

Figure 4B:
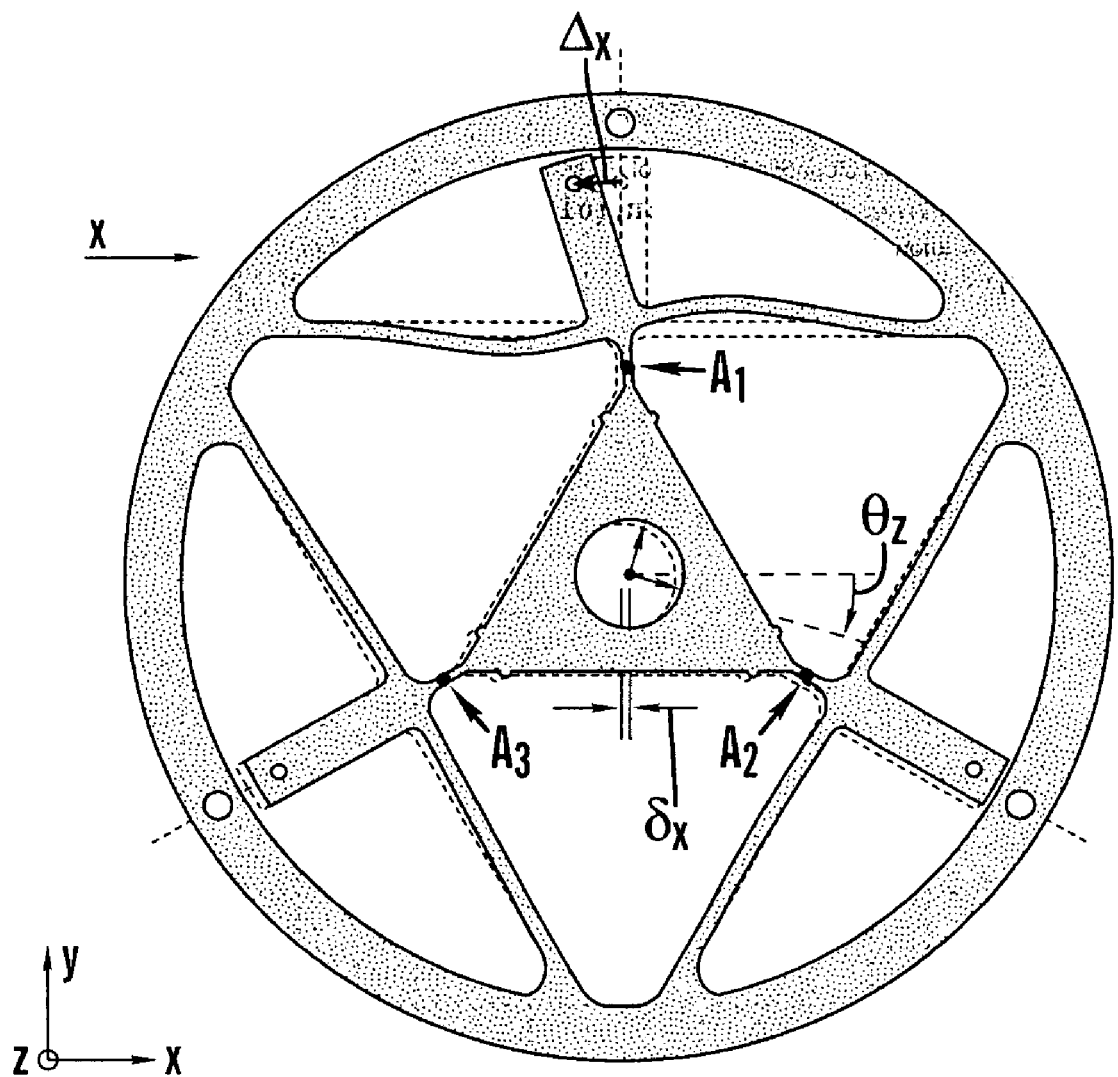
FIG. 4b is a plan view of the compliant mechanism of FIG. 4a showing the effect of an exemplary actuation of one tab.

Referring now to FIGS. 4a and 4b, the relative movement of inner stage 110 with respect to support member 150 is discussed in more detail. The artisan of ordinary skill will readily recognize that while the following discussion pertains to compliant mechanism 100 in particular, the same general principles apply to compliant mechanisms 100' and 100" regarding movement of inner stages 110' and 110" with respect to support members 150' and 150", respectively. The compliant mechanism paradigm described herein effectively utilizes the concept of offsetting (i.e., moving) at least one of the corners of a triangle (e.g., hinge points 122a, 122b, and 122c) from the axes 132a, 132b, and 132c. This may be thought of, and treated mathematically, as being analogous to offsetting the shaft axis of rotation from the plane of symmetry of the groove of one embodiment of the adjustable kinematic coupling disclosed in the above referenced '562 patent application. The compliant mechanism 100 shown in FIGS. 4a and 4b is substantially identical to that of FIG. 1 with the exception that in FIG. 4b, tab 130a has been actuated to the left (i.e., the negative x direction) a distance Δx. The hinge point 122a, originally at position M1 (FIG. 4a), is moved a perpendicular distance x from the axis 132a to position A1 (FIG. 4b). The two non-actuated tabs (tabs 130b and 130c) are constrained by their respective support beams 140 to move parallel to axes 132b and 130c, respectively. To maintain geometric congruence after actuation of tab 130a, tabs 130b and 130c displace along axes 132b and 132c, respectively, resulting in the movement of hinge points 122b and 122c from points M2 and M3 to A2 and A3, respectively. The exemplary actuation shown in FIGS. 4a and 4b results in a displacement of the inner stage 110, with respect to the support member 150, in the x and $\theta_z$ directions.

Figure 5A:
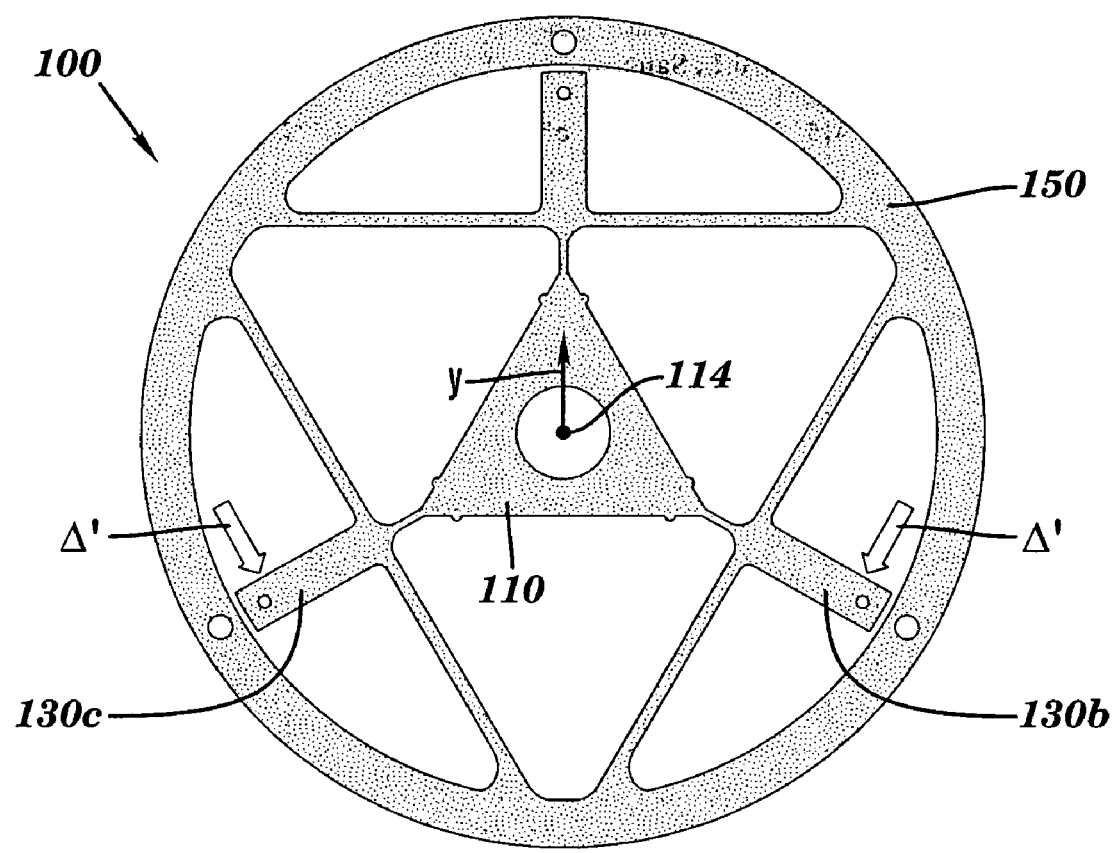
FIG. 5a is a plan view of the compliant mechanism of FIG. 1 showing the effect of an exemplary actuation of two tabs.
Figure 5B:
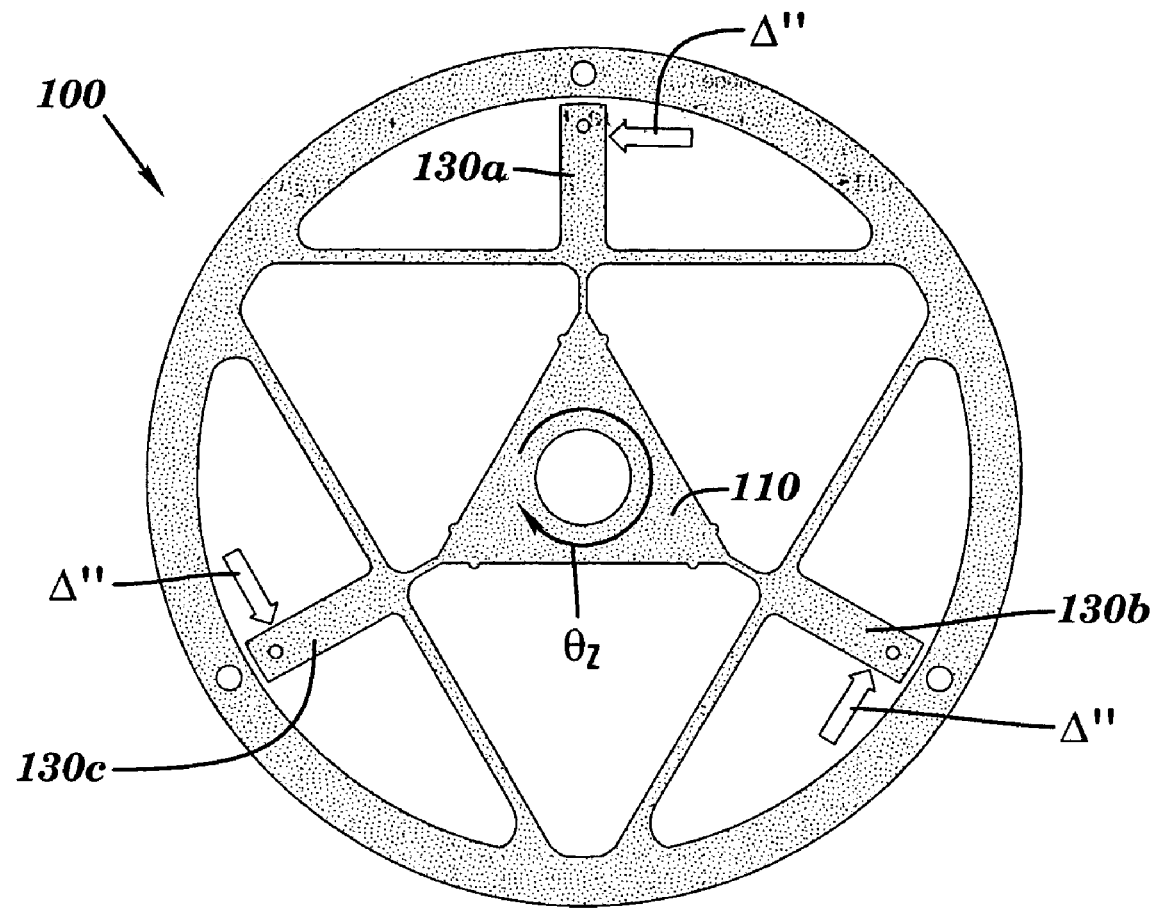
FIG. 5b is a plan view of the compliant mechanism of FIG. 1 showing the effect of an exemplary actuation of three tabs.

Moreover, although in the example shown only element 130a has been actuated, tabs 130b and 130c may also be actuated separately or jointly to affect the relative positions of the inner stage 110 and support member 150 in a controlled and mathematically predictable manner. For example, as shown in FIG. 5a, actuation of tabs 130b and 130c with an equal magnitude (shown as Δ') in opposite directions about axis 114 results in a displacement of the inner stage 110 with respect to the support member 150 in the y direction. In an alternate example, shown in FIG. 5b, actuation of tabs 130a, 130b, and 130c with an equal magnitude (shown as Δ") in the same direction about axis 114 results in a displacement of the inner stage 110 with respect to the support member 150 in the negative $\theta_z$ direction.

The examples shown in FIGS., 4a, 4b, 5a, and 5b illustrate actuation of tabs 130a, 130b, and 130c effecting in-plane (i.e., x, y, and $\theta_z$) relative movement between the inner stage 110 and support member 150. However, tabs 130a, 130b, and 130c may also be actuated in an out-of-plane (i.e., z) direction. Such actuation serves to effect out of plane (i.e., $\theta_x$, $\theta_y$, and z) relative movement between the inner stage 110 and support member 150. For example, actuation of tabs 130a, 130b, and 130c with an equal magnitude in the negative z direction (i.e., into the page in FIG. 5a or 5b) typically results in a displacement of the inner stage 100 with respect to the support member 150 in the positive z direction (i.e., out of the page). However, depending on the geometry and orientation of the tabs, support beams, and hinges, this motion may be in the positive or negative direction. Further, a combination of in plane and out of plane actuation of the tabs 130a, 130b, and 130c enables controlled relative movement in all six degrees of freedom, i.e., in the x, y, z, $\theta_x$, $\theta_y$, and $\theta_z$ directions.

One advantage of various embodiments (e.g., compliant mechanisms 100, 100', and 100") of the present invention is that they may be fabricated to include a relatively wide range of predetermined displacement ratios. As set forth hereinabove, the displacement ratio is defined as the ratio of actuator input motion to the relative motion between the inner stage 110 and the support member 150. For example, for applications requiring relatively small-scale (e.g., nanometer and sub-nanometer range) accuracy and precision, a compliant mechanism having a relatively large displacement ratio, enabling relatively small relative movements, may be desirable. A compliant mechanism having a relatively large displacement ratio may be fabricated by increasing the length 138 (FIG. 4a) of the tab relative to the distance between the hinge and flexure points (e.g., the distance between hinge point 122a and fulcrum point 134a in FIG. 2a) and/or the compliance of the tab. Alternatively, for applications in which a wider range of relative motion is required (e.g., on the order of millimeters or more), a compliant mechanism having a relatively small displacement ratio may be desirable. A compliant mechanism having a relatively small displacement ratio may be fabricated by decreasing the length of the tab 138 relative to the distance between the hinge and flexure points. For typical applications it may be desirable for the compliant mechanisms of this invention to include a displacement ratio in the range from about 0.1 to about 1000. For some particular applications it may be desirable for the compliant mechanisms of this invention to include a displacement ratio in a range of about 2 to about 20.

In alternative embodiments, the inventive compliant mechanism may be used, as stated hereinabove, in the precision alignment of a relatively wide range of product components, fixtures and the like. In some applications, the flexure hinges (e.g., flexure hinges 120a, 120b, and 120c in FIG. 1) may be spaced to form triangles that are not substantially equilateral. This may be beneficial in that it renders motion control in a predetermined direction more or less sensitive to actuator input. Further, the need to use non-equilateral geometry may arise in applications in which the structure of various components does not permit equilateral spacing.

The compliant mechanisms of this invention may be fabricated from substantially any material. Prototypes have been fabricated using metallic materials, such as aluminum alloy 6061, using an abrasive water jet cutting tool. Metallic compliant mechanisms may be advantageous in that they may provide for both elastic and plastic deformation of the mechanism's components. It is further envisioned that the compliant mechanisms of this invention may be fabricated from other materials, such as silicon or doped silicon wafers, using a technique such as deep reactive ion etching (DRIE). DRIE fabrication may be advantageous in that relatively small compliant mechanisms may be formed (e.g., having a characteristic diameter as small or even smaller than 2500 microns).

The artisan of ordinary skill will readily recognize that there are many variable shapes and configurations for the various portions (i.e., the inner stage, the hinge portion, the tabs, the support beams, and the support members) of the compliant mechanism of this invention that may be used to alter the repeatability, resolution, displacement ratio, and position control capabilities of the compliant mechanism.

The modifications to the various aspects of the present invention described hereinabove are merely exemplary. Other variations, modifications, and other implementations of what is described herein will also occur to those of ordinary skill in the art without departing from the spirit and the scope of the invention as claimed. Accordingly, the invention is to be defined not just by the preceding illustrative description, but instead by the spirit and scope of the following claims.

What is claimed is:

1. A compliant mechanism comprising:
   a stage;
   a support including three support beams joined at opposite ends thereof to form a triangle;
   a plurality of flexure hinges coupled to said stage and to said support;
   at least one tab;
   said tab being coupled to at least one of said plurality of flexure hinges;
   said tab extending outwardly relative to said stage beyond said support beams;
   said tab being sized and shaped wherein displacement of said tab generates a displacement of said stage relative to said support;
   said compliant mechanism being of monolithic, planner construction; and
   the relative position between said stage and said support being adjustable in at least any one of six degrees of freedom.

2. The compliant mechanism of claim 1 wherein the relative position between said stage and said support is adjustable in at least any one of six degrees of freedom.

3. The compliant mechanism of claim 1 wherein the relative position between said stage and said support is repeatedly adjustable in at least any one of six degrees of freedom.

4. The compliant mechanism of claim 1 wherein the relative position between said stage and said support member is adjustable with a translational resolution in increments of less than about 100 nanometers.

5. The compliant mechanism of claim 1 wherein the relative position between said stage and said member is adjustable with a translational resolution in increments on the order of one nanometer.

6. The compliant mechanism of claim 1 wherein the relative position between said stage and said member is adjustable with a rotational resolution in increments of less than about 5 micro radians.

7. The compliant mechanism of claim 1 wherein the relative position between said stage and said member is adjustable with a rotational resolution in increments on the order of micro-radians.

8. The compliant mechanism of claim 1 comprising a displacement ratio of the displacement of said tab to the displacement of said stage in a range from about 0.1 to about 1000.

9. The compliant mechanism of claim 8 wherein said displacement ratio is in a range of about 2 to about 20.

10. The compliant mechanism of claim 1 wherein said tab and said stage are flat to respectively define first and second planes, said first and second planes being co-planer with one another at a predetermined displacement of said tab.

11. The compliant mechanism of claim 1 wherein said compliant mechanism comprises an aluminum alloy.

12. The compliant mechanism of claim 1 wherein said compliant mechanism comprises silicon.

13. The compliant mechanism of claim 1 wherein said stage comprises a mount.

14. The compliant mechanism of claim 1 wherein said stage comprises a substantially triangular shape.

15. The compliant mechanism of claim 1 wherein said stage comprises a substantially circular shape.

16. The compliant mechanism of claim 1 wherein said plurality of flexure hinges includes a hinge point and wherein displacement of said tab effects a displacement of said hinge point in a direction opposite of that of said tab.

17. The compliant mechanism of claim 1 wherein said plurality of flexure hinges includes a hinge point disposed on an axis extending outward from said stage.

18. The compliant mechanism of claim 17 wherein displacement of said tab effects a displacement of said binge point in a direction substantially orthogonal to said axis.

19. The compliant mechanism of claim 1 comprising a linear actuator coupled to said tab, wherein said linear actuator is configured to effect the displacement of said tab.

20. The compliant mechanism of claim 19, further comprising a controller coupled to said linear actuator to automatically effect the displacement of said tab.

21. The compliant mechanism of claim 1 wherein said tab functions as a lever arm and is coupled to said support at a fulcrum point.

22. The compliant mechanism of claim 1 wherein said stage is coupled to three flexure hinges.

23. The compliant mechanism of claim 22 comprising three tabs, each of which is coupled to a mutually distinct one of said three flexure hinges.

24. The compliant mechanism of claim 22 wherein said three flexure hinges are spaced to form a substantially equilateral triangle.

25. The compliant mechanism of claim 1 wherein said plurality of support beams are arranged in a substantially equilateral triangular pattern.

26. The compliant mechanism of claim 1 wherein said support comprises an annular support ring.

27. The compliant mechanism of claim 26 wherein said support comprises a plurality of mounts adapted for fastening said compliant mechanism to another component.

28. The compliant mechanism of claim 1 comprising three support members coupled to said plurality of support beams.

29. The compliant mechanism of claim 28 wherein said three support members are arranged in the form of a substantially equilateral triangle.

30. The compliant mechanism of claim 28 wherein said three support members comprise a disk having a substantially central hole adapted for fastening said compliant mechanism to another component.

31. The compliant mechanism of claim 28 wherein said three support members comprise a constraining compliant mechanism.

32. The compliant mechanism of claim 31 wherein said three support members further comprise a mount for fastening said compliant mechanism to another component.

33. The compliant mechanism of claim 1, comprising a plurality of tabs each extending outwardly from said stage beyond said support and having a longitudinal axis, said longitudinal axes intersecting one another within an outer periphery of said stage.

34. The compliant mechanism of claim 1, being incorporated into an optical alignment machine configured to adjust the position of an element of an optical device.

35. The compliant mechanism of claim 1, wherein said storage is substantially triangular.

36. An apparatus comprising:
a first reference frame;
a second reference frame including three support beams joined at opposite ends thereof to form a triangle;
at least one flexure hinge coupled to said first and second reference frames;
a member coupled to said flexure hinge;
said member extending outwardly relative to said first reference frame beyond said support beams;
said apparatus being monolithic and planner;
wherein movement of said member generates displacement of said first reference frame relative to said second reference frame;
an actuator connected to said member to effect said displacement thereof; and
the relative position between said first reference frame and said second reference frame is adjustable in at least any one of six degrees of freedom.

37. The apparatus of claim 36, comprising mounts disposed on the first and second frames.

38. The apparatus of claim 37 being sized and shaped wherein a ratio of said movement to said displacement is in a range of about 0.1 to about 1000.

39. The apparatus of claim 38 wherein said ration is in a range of about 2 to about 20.

40. The apparatus of claim 36, wherein:
said member comprises a proximal end, a medial portion, and a distal end;
said proximal end is coupled to said flexure hinge;
said medial portion is coupled to said second reference frame; and
wherein movement of said distal end generates displacement of said first reference frame relative to said second reference frame.

41. A planner compliant mechanism of monolithic construction comprising;
a stage coupled to a plurality of flexure hinges;
a plurality of tabs, each of which is coupled to a mutually distinct one of said flexure hinges;
a plurality of support beams coupled to said tabs, said support beams joined at opposite ends thereof to form a triangle;
said tabs extending outwardly relative to said stage beyond said support beams;
at least one support member coupled to said support beams, said support member including at least one mount for fastening said compliant mechanism to another structure;
wherein said tabs from lever arms coupled to said plurality of support beams at a plurality of fulcrum points;
wherein displacement of any one of said tabs results in a displacement of said stage relative to said support member;
an actuator connected to said tab to effect said displacement thereof;
wherein the relative position between said stage and said support member is adjustable in any one or more of six degrees of freedom; and
said compliant mechanism being monolithic and planar.

* * * * *